United States Patent [19]

Horikoshi et al.

[11] Patent Number: 4,541,082
[45] Date of Patent: Sep. 10, 1985

[54] DEVICE FOR OPTICALLY TRACKING INFORMATION

[75] Inventors: Tatsuo Horikoshi, Toyokawa; Seiji Yonezawa, Hachioji; Toshiaki Tsuyoshi, Kokubunji; Hiroshi Tooyama, Hachioji; Masatoshi Otake, Ome, all of Japan

[73] Assignee: Hitachi, Ltd., Tokyo, Japan

[21] Appl. No.: 443,033

[22] Filed: Nov. 19, 1982

[30] Foreign Application Priority Data

Nov. 25, 1981 [JP] Japan ................. 56-187871

[51] Int. Cl.³ .................. G11B 7/12; G11B 21/10
[52] U.S. Cl. .......................... 369/44; 369/46; 250/202
[58] Field of Search ............ 369/44, 46; 360/77; 250/202

[56] References Cited

U.S. PATENT DOCUMENTS 4,057,833 11/1977 Braat .................... 369/109
4,234,837 11/1980 Winslow ................. 360/77

Primary Examiner—Alan Faber
Attorney, Agent, or Firm—Antonelli, Terry & Wands

[57] ABSTRACT

A device for optically tracking information recorded on an optical disc wherein a photodetector is disposed on the optical axis of an optical system for guiding diffracted waves to the photodetector. The origin of a fictitious X-Y coordinate system at the photodetector is placed on the above-mentioned optical axis, X- and Y-axes of the coordinate system are made parallel to and perpendicular to an information track having the information pits on the rotating recording medium, and the photodetector is divided into four equal parts. A first summation signal indicating the sum of output signals from the four parts of the photodetector is converted into a binary signal, and a difference signal between second summation signals each indicating the sum of output signals from a pair of photodetector parts facing each other with the origin of the coordinate system therebetween is converted into another binary signal. A signal indicating a direction in which the light beam deviates from the information track, is formed on the basis of the above-mentioned binary signals, and a tracking signal indicating the deviation of the light beam from the information track is formed by full-wave rectifying the difference signal and modifying the rectified signal with the above-mentioned direction indicating signal.

10 Claims, 47 Drawing Figures

DEVICE FOR OPTICALLY TRACKING INFORMATION

BACKGROUND OF THE INVENTION

1. Field of the Invention

The present invention relates to a device for optically tracking information, and more particularly to an information tracking device for tracking information which is recorded on an optical disc in the form of a track.

2. Description of the Prior Art

An optical system for tracking video or audio information which is recorded on a rotating disc in the form of a track, to optically reproduce the recorded information is disclosed in, for example, a Japanese patent application Laid-Open No. 93222/1977. In addition to such an optical system, an optical system shown in FIG. 1 can be used to carry out tracking. When a tracking signal is formed using the optical system shown in FIG. 1, a photodetector and a signal processor can be used which are disclosed in the above-referred Japanese patent application. FIG. 2 shows the above-mentioned photodetector and signal processor.

Figure 1:
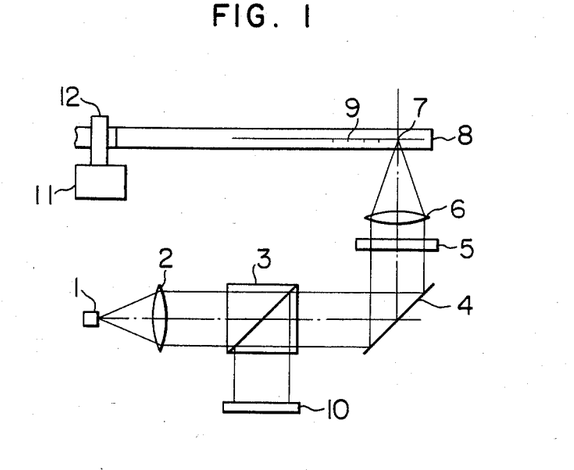
FIG. 1 is a schematic view showing an outline of a device for tracking information recorded in an optical disc to reproduce the recorded information.
Figure 2:
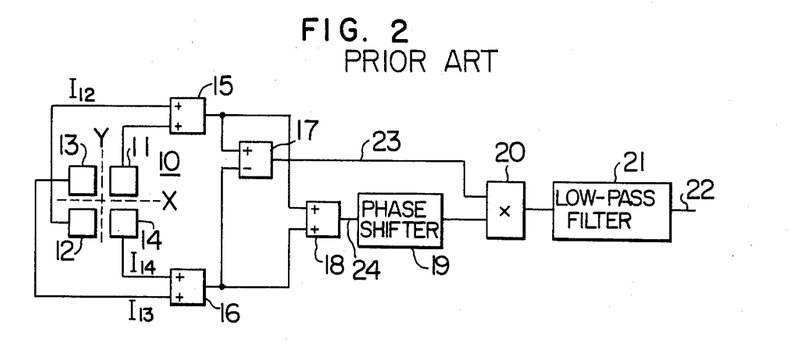
FIG. 2 is a block diagram showing a photodetector and a signal processor according to a prior art which are used to obtain a tracking signal.

Referring to FIG. 1, light emitted from a laser light source 1 passes through a coupling lens 2, a beam splitter (that is, a polarizing prism) 3, a galvanometer mirror 4, a quarter-wave plate 5 and an object lens 6, to form a light spot 7 on an array of information pits (that is, a track 9) which is formed on the surface of a disc 8. Light which has been diffracted by the information pits and reflected by the disc 8, passes through the lens 6, quarter-wave plate 5 and mirror 4, and is then reflected by the beam splitter 3 due to the function of the quarter-wave plate 5, to be received by a photodetector 10.

In the above-mentioned optical system, the quantity of light returning to the laser light source 1 can be reduced without being affected by the reflection factor at the mirror 4. This is because the mirror 4 is disposed between the polarizing prism 3 and quarter-wave plate 5. This fact will be explained below in detail. Now, let us assume that the polarizing prism 3 transmits P polarized light and interrupts S polarized light.

Further, let us assume, for simplicity's sake, that the transmission factor of the P polarized light having passed through the polarizing prism 3 is 1, the reflection factor of the S polarized light at the polarizing prism 3 is 1, the retardation due to reflection at the disc 8 is zero, and respective reflection factors of the P polarized light and S polarized light at the disc 8 are both equal to 1.

When the plane of polarization of light having passed through the polarizing prism 3 makes 45° with X- and Y-axes of a rectangular coordinate system and the reflection factors of the P polarized light and S polarized light at the mirror 4 are expressed by a and b, respectively, X- and Y-components $E_{1X}$ and $E_{1Y}$ of light having passed through the prism 3 and having been reflected by the mirror 4 are given by the following equations:

$$E_{1X} = aP \sin \omega t, \quad E_{1Y} = aP \sin \omega t \qquad (1)$$

where P indicates the output power of light emitted from the laser light source 1, and $\omega$ the angular frequency of light.

That is, the light having been reflected by the mirror 4 is linearly-polarized light. When this light passes through the quarter-wave plate 5, only the Y-component $E_{1Y}$ is subjected to a 90° phase shift. Thus, the light having passed through the quarter-wave plate 5 has X- and Y-components $E_{2X}$ and $E_{2Y}$ as follows:

$$E_{2X} = \frac{aP}{\sqrt{2}} \sin \omega t, \quad E_{2Y} = \frac{aP}{\sqrt{2}} \cos \omega t \qquad (2)$$

That is, the light having passed through the quarter-wave plate 5 is circularly-polarized light.

Further, X- and Y-components $E_{3X}$ and $E_{3Y}$ of light reflected from the disc 8 are given by the following equations:

$$E_{3X} = -\frac{aP}{\sqrt{2}} \sin \omega t, \quad E_{3Y} = \frac{aP}{\sqrt{2}} \cos \omega t \qquad (3)$$

That is, the light reflected from the disc 8 is circularly-polarized light which is opposite in the direction of rotation of electric field vector to the circularly-polarized light incident on the disc 8. The light having been reflected from the disc 8 passes through the quarter-wave plate 5, and light having passed through the quarter-wave plate 5 has X- and Y-components $E_{4X}$ and $E_{4Y}$ as follows:

$$E_{4X} = -\frac{aP}{\sqrt{2}} \sin \omega t, \quad E_{4Y} = \frac{aP}{\sqrt{2}} \sin \omega t \qquad (4)$$

That is, the reflected light having passed through the quarter-wave plate 5 is perfect, linearly-polarized light, and the plane of polarization thereof is rotated through 90° as compared with the plane of polarization of the incident light from the mirror 4. Thus, the quantity of light capable of returning to the laser light source 1 is theoretically equal to zero.

As mentioned above, when the mirror 4 is disposed between the polarizing prism 3 and quarter-wave plate 5, the plane of polarization of light which is incident on the polarizing prism 3 after having been reflected from the disc 8, is rotated through 90°, without being affected by the reflection factor at the mirror 4, and thus this light becomes perfect, S polarized light.

In contrast to the above-mentioned, when the mirror 4 is disposed between the quarter-wave plate 5 and disc 8, light incident on the polarizing prism 3 after having been reflected from the disc 8 is affected by a difference between respective reflection factors of the P polarized light and S polarized light at the mirror 4, and therefore the plane of polarization of this light is not subjected to 90° of rotation, that is, the light cannot become perfect, S polarized light. Thus, the light contains a P polarized light component, and therefore it is inevitable that some light quantity returns to the laser light source.

In an optical disc device in which a semiconductor laser is used as a light source, even a very small quantity of light which is returned from an optical disc to a laser resonator, disturbs the oscillating state of the laser, and causes noise. Accordingly, it is specifically important in such a device to reduce the quantity of light returning to the laser.

Incidentally, in FIG. 1, reference numeral 11 designates a motor for rotating the disc 8, and 12 a spindle of the motor 11.

Referring now to FIG. 2, the origin of a rectangular coordinate system at the photodetector 10 is placed on the optical axis of the optical system shown in FIG. 1, and X- and Y-axes of the coordinate system are set in parallel with and perpendicularly to the direction of the track on the disc, respectively. The photodetector 10 is made up of four photodetectors 11, 13, 12 and 14 situated respectively at the first, second, third and fourth quadrants. These photodetectors 11, 13, 12 and 14 deliver output signals $I_{11}$, $I_{13}$, $I_{12}$ and $I_{14}$, respectively. A difference signal DF expressed by an equation $DF=(I_{11}+I_{12})-(I_{13}+I_{14})$ (hereinafter referred to as "DF signal") is formed by adders 15 and 16 and a subtracter 17. A summation signal RF expressed by an equation $RF=(I_{11}+I_{12})+(I_{13}+I_{14})$ (hereinafter referred to as "RF signal") is formed by adders 15, 16 and 18. The RF signal 24 thus formed is applied to a phase shifter 19 to shift the phase of the RF signal by 90°. The output of the phase shifter 19 and the DF signal 23 are applied to a multiplier 20, the output of which is applied to a low-pass filter 21 to obtain a tracking signal 22. In such a conventional device, the combination of the multiplier 20 and low-pass filter 21 is used to obtain the tracking signal. Accordingly, the device has the following problems:

(i) The tracking error detecting sensitivity is low, that is, the so-called tracking signal 22 which is produced when the light spot 7 deviates from the center line of the information track 9, is outputted at a low level.

(ii) The tracking offset which is produced when the disc 8 or galvanometer mirror 4 is inclined, is large.

SUMMARY OF THE INVENTION

An object of the present invention is to provide a tracking device which can solve all of the problems produced when a tracking signal is calculated on the basis of summation and difference signals (namely, RF and DF signals) obtained from four output signals of the quadrant photodetector shown in FIG. 2, that is, the problems that the tracking error detecting sensitivity is low and the tracking offset is large.

In order to attain the above object, according to the present invention, peak values of the DF signal are used in forming the tracking signal, to increase the tracking error detecting sensitivity, thereby reducing the tracking offset. Thus, tracking can be carried out stably.

The present invention will become more apparent from the following detailed description of embodiments thereof taken in conjunction with the accompanying drawings.

DESCRIPTION OF THE PREFERRED EMBODIMENTS

EMBODIMENT I

Figure 3A:
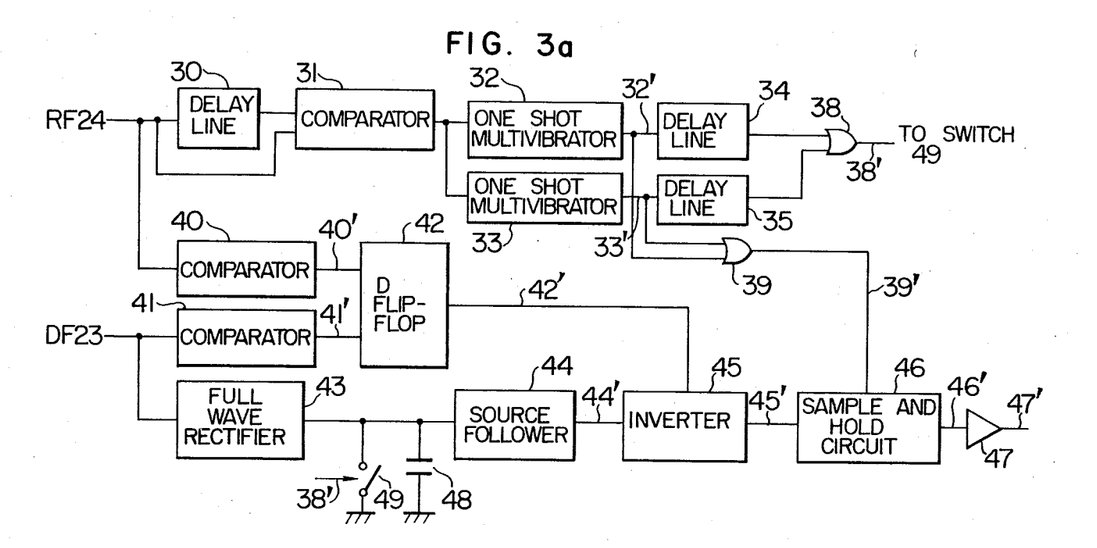
FIGS. 3a, 3b, and 4a to 4j are views for explaining a first embodiment of the present invention.
Figure 3B:
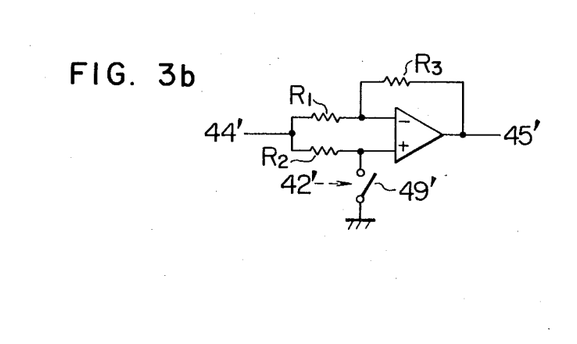

FIG. 3a is a block diagram showing a circuit for obtaining a tracking signal, FIG. 3b is a circuit diagram showing an example of the inverter 45 shown in FIG. 3a, and FIGS. 4a to 4j show signal waveforms and others to explain the operation of the circuit shown in FIG. 3a.

Figure 4A:
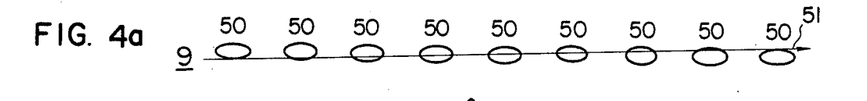
Figure 4B:
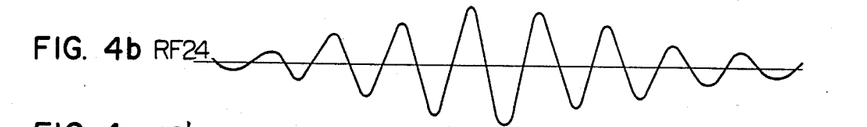
Figures 4C, 4D:
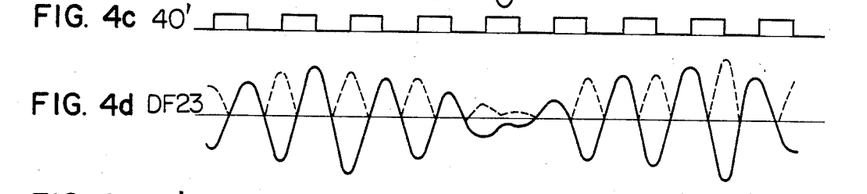
Figure 4E:
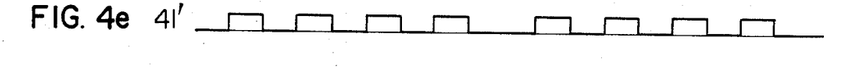
Figures 4F, 4G:
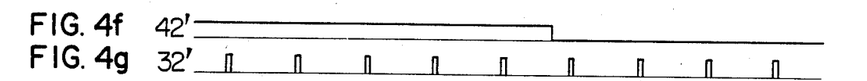
Figures 4H, 4I, 4J:
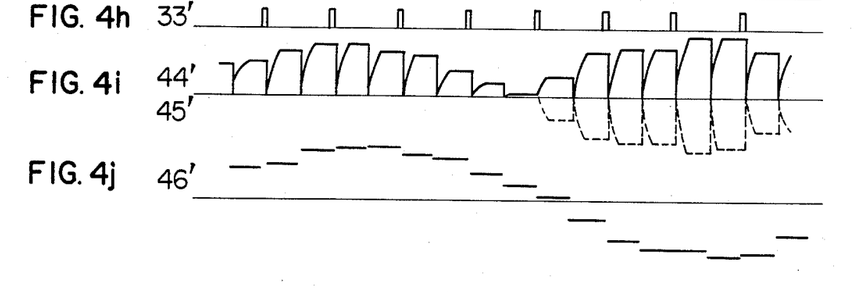

Referring to FIG. 4a, an array of pits 50 is formed on the track 9, and these pits are irradiated with the light spot 7 in such a manner that a locus 51 of the light spot 7 crosses the pits on the track slightly obliquely. At this time, a summation signal (namely, RF signal) 24 shown in FIG. 4b and a difference signal (namely, DF signal) 23 shown in FIG. 4d are formed on the basis of the output signals of the photodetectors 11 to 14. The RF signal 24 takes a minimum level at the center of each information pit, and the DF signal 23 takes a maximum or minimum level at edges of each information pit. Further, when these RF and DF signals are viewed time-sequentially, the DF signal 23 lags the RF signal 24 by a phase angle of 90° at one side of the track, and leads the RF signal 24 by a phase angle of 90° at the other side of the track during crossing of the track. A method for obtaining a tracking signal 47' from the RF signal 24 and DF signal 23 will be explained below. First, explanation will be made on a method of detecting a direction in which the light spot 7 deviates from the center line of the track 9. Referring to FIG. 3a, the RF signal 24 and DF signal 23 are applied respectively to comparators 40 and 41, which deliver output signals 40' and 41' shown in FIGS. 4c and 4e. The signals 40' and 41' are applied to a D flip-flop circuit 42, which delivers an output signal 42'. The direction in which the light spot 7 deviates from the center line of the track 9, is detected on the basis of whether the level of the signal 42' is high or low. FIG. 4f shows the signal 42'. Next, explanation will be m2ade on a method of detecting the absolute value of deviation of the light spot from the center line of the track 9. The DF signal 23 is applied to a full-wave rectifier 43, the output signal of which is indicated by the combination of broken and solid lines in FIG. 4d. The peak values of the full-wave rectified signal are detected by a capacitor 48 and a source follower 44. A peak holding operation for holding each peak value is reset by a switch 49, and the switch 49 is controlled by a signal which is obtained from the RF signal 24 in such a manner as mentioned later. The resetting operation is indicated by a solid-line portion in FIG. 4i. A peak holding signal 44' thus obtained is applied to an inverter 45, and a switch 49' shown in FIG. 3b is controlled by the direction indicating signal 42'. Thus, a peak holding signal 45' including the direction of deviation are obtained which is shown in FIG. 4i. The signal 45' is applied to a sample/hold circuit 46 to be sampled and held by a pulse signal 39' which is obtained from the RF signal 24 in a manner as mentioned later. Thus, a signal 46' shown in FIG. 4j is delivered from the sample/hold circuit 46. The signal 46' is amplified by an amplifier 47 to obtain a tracking signal 47'. The pulse 38' for controlling the switch 49 and the pulse 39' for controlling the sample/hold circuit 46 are generated in a manner as mentioned below. The RF signal 24 is applied to one-shot multivibrators 32 and 33 through a delay line 30 and a comparator 31. Thus, a pulse signal 32' (shown in FIG. 4g) is outputted at negative peaks of the RF signal 24, and a pulse signal 33' (shown in FIG. 4h) is outputted at positive peaks of the RF signal 24. The pulse signals 32' and 33' are applied to an OR circuit 39 acting as a driver, and thus the signal 39' for controlling the sample/hold circuit 46 is delivered from the OR circuit 39. As mentioned above, the pulse signals 32' and 33' are used to form the control signal 39'. Further, the pulse signals 32' and 33' are applied to an OR circuit 38 acting as a driver through delay lines 34 and 35, respectively, to obtain a signal 38' for closing the switch 49. Thus, the capacitor 48 for holding a peak value is discharged after the sample/hold operation is completed in response to the signal 38'. FIG. 3b shows an example of the inverter 45. Referring to FIG. 3b, resistance values of resistors $R_1$, $R_2$ and $R_3$ are expressed by the same reference symbols as the resistors, and these resistance values $R_1$, $R_2$ and $R_3$ are made equal to each other. Further, the switch 49' is controlled by the direction indicating signal 42'. Thus, the peak holding signal 45' including information on the direction in which the light spot deviates from the center line of the track 9, is delivered from the circuit shown in FIG. 3b.

According to the present embodiment, a tracking signal is obtained which is high in tracking error detecting sensitivity and can make small the tracking offset.

EMBODIMENT II

Figure 5A:
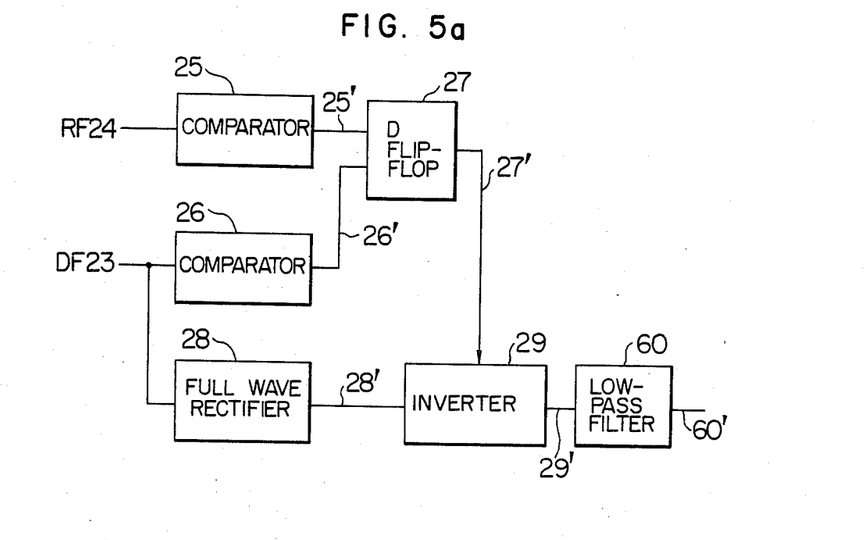
FIGS. 5a, 5b, and 6a to 6h are views for explaining a second embodiment of the present invention.
Figure 5B:
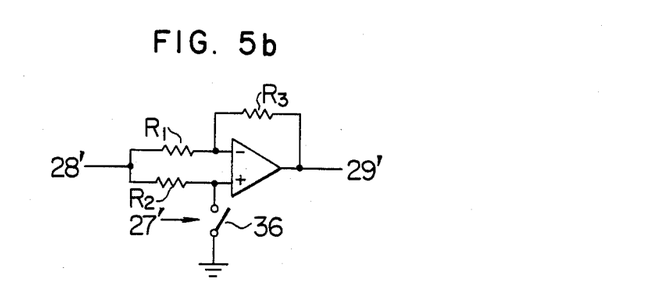

FIGS. 5a, 5b, and 6a to 6h are concerned with a second embodiment of the present invention. FIG. 5a is a block diagram showing a circuit for obtaining a tracking signal, FIG. 5b is a circuit diagram showing an example of the circuit block 29 shown in FIG. 5a, and FIGS. 6a to 6h show signal waveforms and others to explain the operation of the circuit shown in FIG. 5a.

Figure 6A:
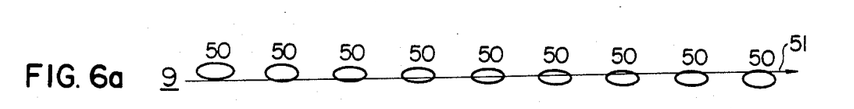
Figure 6B:
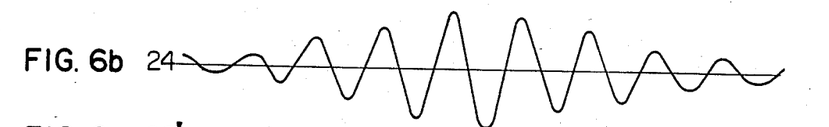
Figure 6C:
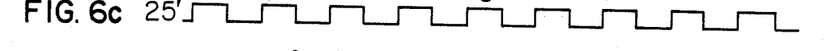
Figure 6D:
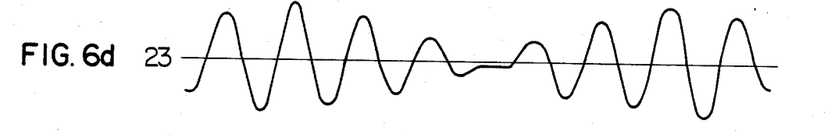
Figure 6E:
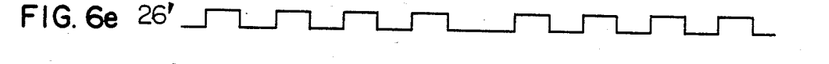
Figure 6F:
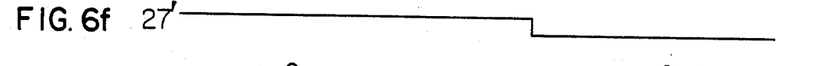
Figure 6G:
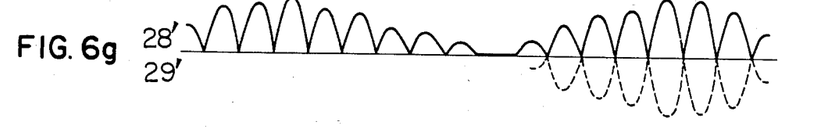
Figure 6H:
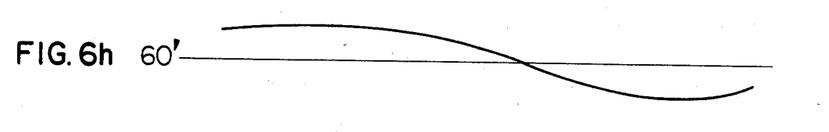

A method for detecting a direction in which the light spot 7 forming a locus 51 shown in FIG. 6a deviates from the center line of the track 9, is similar to the method explained in EMBODIMENT I. That is, an RF signal 24 shown in FIG. 6b and a DF signal 23 shown in FIG. 6d are applied to comparators 25 and 26, respectively, to convert each of these signals into a binary signal by using the center level of each signal as a threshold level. An output signal 25' (shown in FIG. 6c) from the comparator 25 and an output signal 26' (shown in FIG. 6e) from the comparator 26 are applied to a D flip-flop circuit 27, which functions so that the level (high or low level) of the signal 26' at either one of rising and falling times of the signal 25' is held. In the present embodiment which is explained using the waveforms shown in FIGS. 6b to 6h, the level of the signal 26' at the falling time of the signal 25' is held. Thus, the direction of tracking deviation is determined on the basis of whether the level of an output signal 27' (shown in FIG. 6f) from the D flip-flop circuit 27 is high or low. Next, explanation will be made on a method of detecting the absolute value of deviation of the light spot 7 from the center line of the track 9. The DF signal 23 is applied to a full-wave rectifier 28 to obtain an output signal 28' which is indicated by a solid line in FIG. 6g. The envelope of the signal 28' indicates the absolute value of tracking deviation. Therefore, the signal 28' is applied to an inverter 29, in which the polarity of a portion of the signal 28' is reversed by the direction-of-deviation indicating signal 27' from the D flip-flop circuit 27. Thus, the inverter 29 delivers an output signal 29' shown in FIG. 6g. (The signal 29' is indicated by a common solid line in the left part of FIG. 6g and a broken line in the right part thereof.) FIG. 5b shows an example of the inverter 29. Referring to FIG. 5b, resistance values of resistors $R_1$, $R_2$ and $R_3$ are expressed by the same reference symbols as the resistors, and there resistance values $R_1$, $R_2$ and $R_3$ are made equal to each other. Further, a switch 36 is controlled by the signal 27'.

The signal 29' is applied to a low-pass filter 60 to remove from the signal 29' a ripple component at the frequency band of the RF signal. Thus, an intended tracking signal 60' (shown in FIG. 6h) is obtained.

According to the present embodiment, a tracking signal which is relatively high in tracking error detecting sensitivity, can be formed using a simple circuit configuration.

EMBODIMENT III

Figure 7:
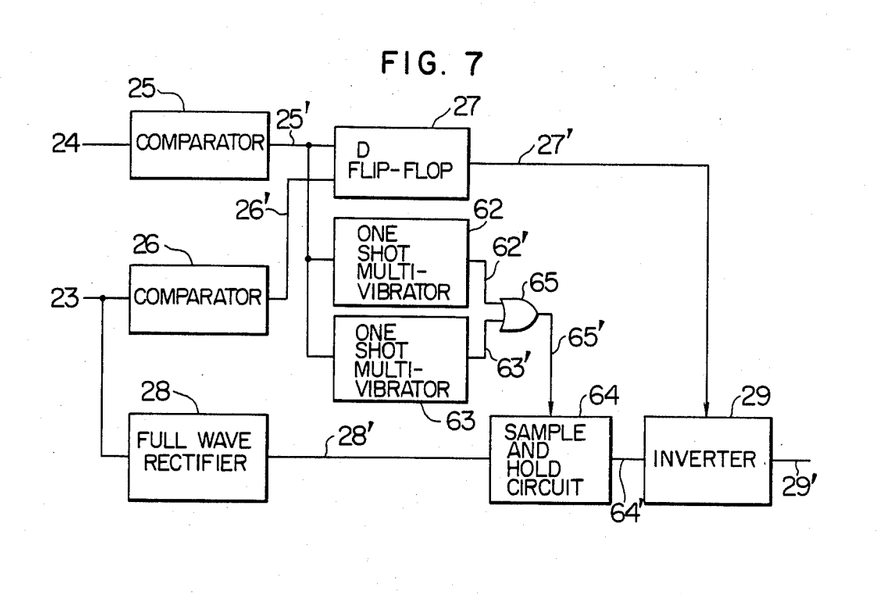
FIGS. 7 and 8a to 8l are views for explaining a third embodiment of the present invention.
Figure 8A:
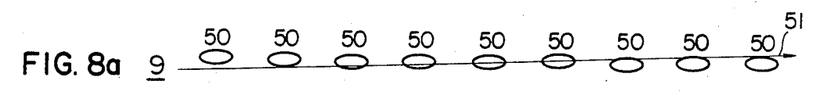
Figures 8B, 8C:
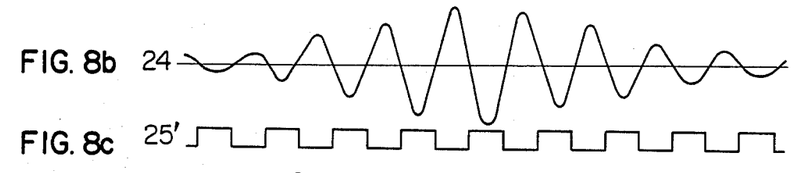
Figure 8D:
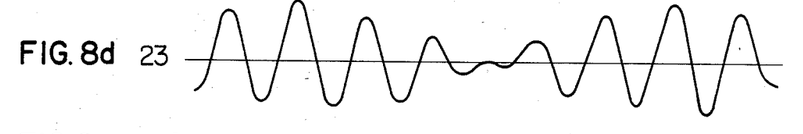
Figure 8E:
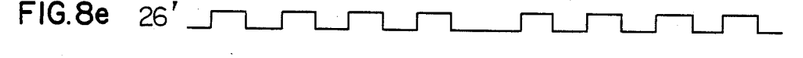
Figure 8F:
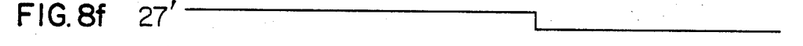
Figure 8G:
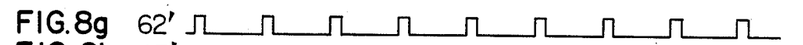
Figure 8H:
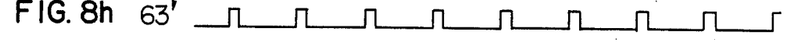
Figure 8I:
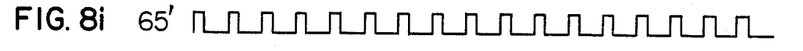
Figures 8J, 8K:
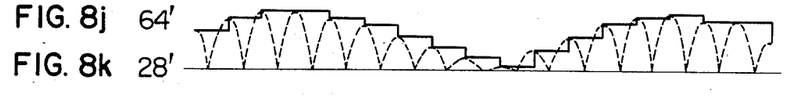
Figure 8L:
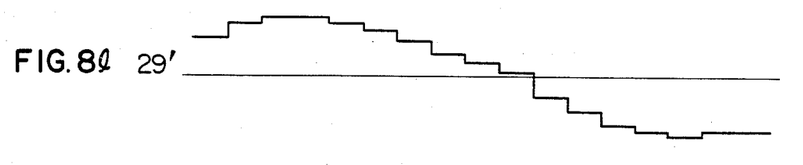
Figure 9:
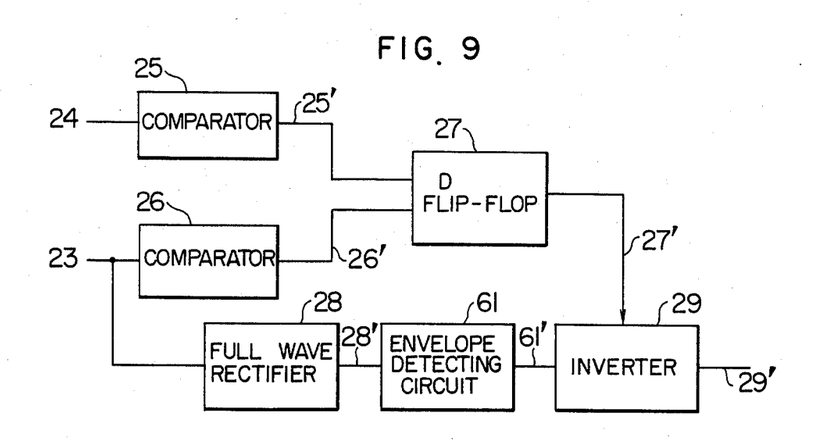
FIGS. 9 and 10a to 10i are views for explaining a fourth embodiment of the present invention.

FIGS. 7 and 8a to 8l are views for explaining a third embodiment of the present invention. FIG. 7 is a block diagram showing a circuit for obtaining a tracking signal, and FIGS. 8a to 8l show signal waveforms and others to explain the operation of the circuit shown in FIG. 7. In the circuit shown in FIG. 7, a sample/hold circuit is added to the circuit shown in FIG. 5a in order to make the tracking error detecting sensitivity higher than in EMBODIMENT II. A method for detecting a direction in which the light spot deviates from the center line of the track 9 shown in FIG. 8a, is similar to the method explained in EMBODIMENTs I and II. That is, an RF signal 24 shown in FIG. 8b and a DF signal 23 shown in FIG. 8d are applied to comparators 25 and 26, respectively. An output signal 25' (shown in FIG. 8c) from the comparator 25 and an output signal 26' (shown in FIG. 8e) from the comparator 26 are applied to a D flip-flop circuit 27 to obtain a signal 27' shown in FIG. 8f. In order to obtain a signal indicating the absolute value of tracking deviation, the DF signal 23 is applied to a full-wave rectifier 28 as in EMBODIMENT II, and is subjected to full-wave rectification. Thus, an output signal 28' is obtained which is indicated by a broken line in FIG. 8k. In the present embodiment, the signal 28' is applied to a sample/hold circuit 64 to sample and hold peak values of the signal 28'. In more detail, the DF signal takes a peak value when the light spot crosses edges of a pit in its longitudinal direction. Accordingly, the sample/hold circuit 64 is triggered at each of rising and falling times of the binary signal 25', which is obtained by processing the RF signal 24 with the comparator 25. Actually, the signal 25' is applied to an one-shot multivibrator 62, which delivers at the rising time of the signal 25' a pulse signal 62' having a predetermined pulse width such as shown in FIG. 8g. Further, the signal 25' is applied to another one-shot multivibrator 63, which delivers at the falling time of the signal 25' a pulse signal 63' having a predetermined pulse width such as shown in FIG. 8h. The pulse signals 62' and 63' are applied to an OR circuit 65, which delivers an output signal 65' (shown in FIG. 8i) to trigger the sample/hold circuit 64. The full-wave rectified signal 28' applied to the sample/hold circuit 64 is sampled and held by the output signal 65', and thus the circuit 64 delivers an output signal 64' such as indicated by a solid line in FIG. 6j. The signal 64' corresponds to the absolute value of tracking deviation. As in EMBODIMENT II, the signal 64' is applied to an inverter 29, in which the polarity of a portion of the signal 64' is reversed by the direction-of-deviation indicating signal 27'. Thus, an intended tracking signal 29' can be obtained which is shown in FIG. 8l.

In the present embodiment, peak values of the DF signal or values approximate thereto are sampled and held to form a tracking signal. Accordingly, the tracking error detecting sensitivity is higher than that in EMBODIMENT II. As a result, the tracking offset can be made small as compared with EMBODIMENT II.

EMBODIMENT IV

FIGS. 9 and 10a to 10i are concerned with a fourth embodiment of the present invention. The present embodiment is similar to the above-mentioned embodiments in that an output signal 28' from a full-wave rectifier is used to obtain the absolute value of deviation of the light spot from the center line of the track, and the output signal 27' from a D flip-flop circuit indicates the direction of the above-mentioned deviation. In the present embodiment, however, the output signal 28' of a full-wave rectifier 28 is applied to an envelope detection circuit 61 which utilizes the charge and discharge of a capacitor. The circuit 61 delivers an output signal 61', which is applied to an inverter 29 to obtain a tracking signal 29'.

Figures 10A, 10B, 10C:
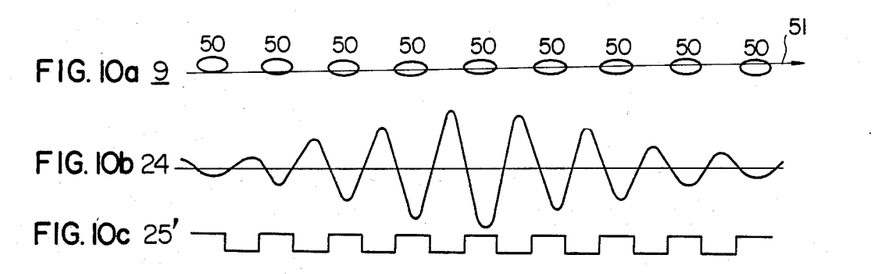
Figures 10D, 10E:
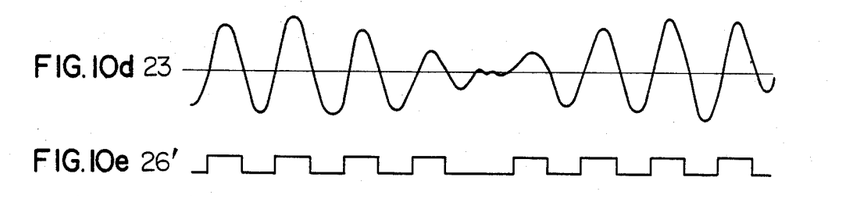
Figure 10F:
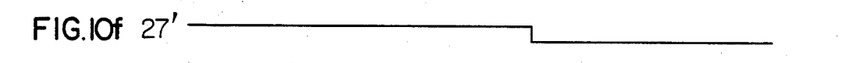
Figure 10G:
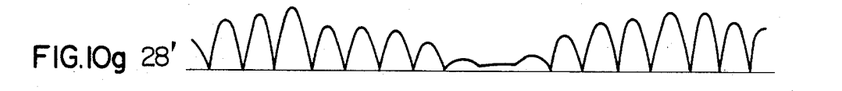
Figure 10H:
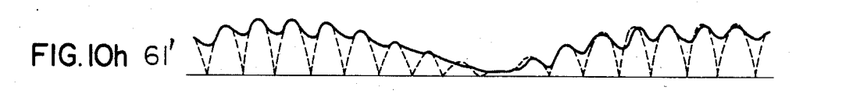
Figure 10I:
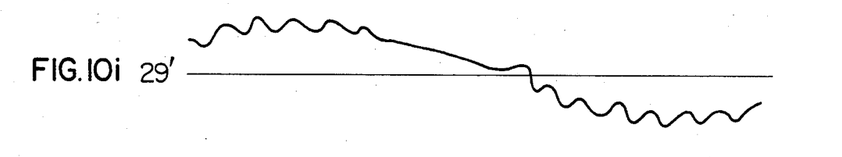

FIGS. 10a to 10i show signal waveforms and others as in EMBODIMENTs I, II and III. The output signal 27' of a D flip-flop circuit 27 is shown in FIG. 10f, the output signal 28' of the full-wave rectifier 28 is shown in FIG. 10g, and the output signal 61' of the envelope detection circuit 61 is indicated by a solid line in FIG. 10h. As shown in FIG. 10h, the waveform of the full-wave rectified signal 28' is smoothed by the envelope detection circuit 61, and therefore the tracking error detecting sensitivity is made higher. However, when the time constant of discharge at the envelope detection circuit is made too large, the output of the circuit cannot follow the correct envelope of the full-wave rectified signal, and therefore the tracking offset is produced. On the other hand, when the time constant of discharge is made too small, the effect of envelope detection is lost. Accordingly, the time constant of discharge is required to be appropriately selected.

As has been explained in the foregoing description, according to the present invention, the tracking error detecting sensitivity is made high, the tracking offset becomes small, and thus stable tracking can be carried out. Accordingly, an operation for reading out information recorded on an audio or video disc can be stably performed.

We claim:

1. A device for optically tracking information suitable for use in an information reproducing device including a laser light source, a rotating recording medium in which predetermined information is recorded in the form of a track so that said information can be optically reproduced, an optical system disposed between said laser light source and said rotating recording medium for irradiating said track with a light beam from said laser light source, and a photodetector for sensing diffracted waves from information pits on said track, to reproduce said information by an electric signal from said photodetector, said device for optically tracking information comprising:

first means for detecting a first summation signal indicating the sum of output signals from four parts of said photodetector, said photodetector being disposed on the optical axis of said optical system, a fictitious X-Y coordinate system at said photodetector having the origin thereof on said optical axis, an X-axis of said coordinate system being made parallel to the direction of said track, a Y-axis of said coordinate system being made perpendicular to the direction of said track, each of said four parts of said photodetector being disposed one by one in four quadrants of said coordinate system;

second means for detecting a difference signal between second summation signals, each of said second summation signals indicating the sum of output signals from a pair of parts of said photodetector, said pair of parts facing each other with said origin of said coordinate system therebetween;

third means for converting said difference signal into a binary signal, said binary signal having one of high and low levels in accordance with a change in amplitude of said first summation signal, an output from said third means indicating a direction in which said light beam deviates from said track; and fourth means for detecting peak values of said difference signal, an output of said fourth means indicating the magnitude of deviation of said light beam from said track.

2. A device for optically tracking information according to claim 1, wherein said third means includes fifth means for converting said first summation signal into a first binary signal, sixth means for converting said difference signal into a second binary signal, and seventh means applied with said first and second binary signals from said fifth and sixth means for holding a level of said second binary signal at the time when the level of said first binary signal varies, and said level of said second binary signal is either one of high and low levels, and wherein said fourth means includes eighth means for full-wave rectifying an output from said second means, ninth means for holding peak values of an output from said eighth means, tenth means applied with an output from said ninth means for reversing the polarity of said output from said ninth means, and eleventh means for sampling and holding an output of said tenth means after the appearance of said peak values, and a polarity-reversing operation at said tenth means is controlled by an output from said seventh means.

3. A device for optically tracking information according to claim 2, wherein each of said fifth and sixth means is a comparator, and said seventh means is a D flip-flop circuit.

4. A device for optically tracking information according to claim 2, wherein said eleventh means includes twelfth means for obtaining positive and negative peak values of said first summation signal, and a sample/hold circuit for sampling and holding an output from said tenth means on the basis of an output from said twelfth means.

5. A device for optically tracking information according to claim 4, wherein said twelfth means includes a delay circuit for delaying said first summation signal, a comparator applied with an output from said delay circuit and said first summation signal for obtaining a third binary signal, and third and fourth monostable multivibrators for generating outputs at rising and falling times of said third binary signal, respectively, and the operation of said sample/hold circuit is controlled by said outputs from said third and fourth monostable multivibrators.

6. A device for optically tracking information according to claim 1, wherein said third means includes fifth means for converting said first summation signal into a first binary signal, sixth means for converting said difference signal into a second binary signal, and seventh means applied with said first and second binary signals from said fifth and sixth means for holding a level of said second binary signal at the time when the level of said first binary signal varies, and said level of said second binary signal is either one of high and low levels, and wherein said fourth means includes eighth means for full-wave rectifying an output from said second means, ninth means for detecting an envelope of an output from said eighth means, and tenth means applied with an output from said ninth means for reversing the polarity of said output from said ninth means, and a polarity-reversing operation at said tenth means is controlled by an output from said seventh means.

7. A device for optically tracking information according to claim 6, wherein each of said fifth and sixth means is a comparator, and said seventh means is a D flip-flop circuit.

8. A device for optically tracking information according to claim 1, wherein said third means includes fifth means for converting said first summation signal into a first binary signal, sixth means for converting said difference signal into a second binary signal, and seventh means applied with said first and second binary signals from said fifth and sixth means for holding a level of said second binary signal at the time when the level of said first binary signal varies, and said level of said second binary signal is either one of high and low levels, and wherein said fourth means includes eighth means for full-wave rectifying an output from said second means, ninth means for sampling and holding an output from said eighth means when the level of said first binary signal varies, and tenth means applied with an output from said ninth means for reversing the polarity of said output from said ninth means, and a polarity-reversing operation at said tenth means is controlled by an output from said seventh means.

9. A device for optically tracking information according to claim 8, wherein said ninth means includes first and second monostable multivibrators for generating outputs at rising and falling times of said first digital signal, respectively, and a sample/hold circuit triggered by said outputs from said first and second monostable multivibrators.

10. A device for optically tracking information according to claim 8, wherein each of said fifth and sixth means is a comparator, and said seventh means is a D flip-flop circuit.

* * * * *